United States Patent [19]

Diepstraten et al.

[11] Patent Number: 5,991,287

[45] Date of Patent: Nov. 23, 1999

[54] SYSTEM AND METHOD FOR PROVIDING SEAMLESS HANDOVER IN A WIRELESS COMPUTER NETWORK

[75] Inventors: Wilhelmus J. M. Diepstraten, Haghorst; Leo Monteban, Nieuwegen, both of Netherlands

[73] Assignee: Lucent Technologies, Inc., Murray Hill, N.J.

[21] Appl. No.: 08/775,122

[22] Filed: Dec. 30, 1996

[51] Int. Cl.[6] .................................................. H04Q 7/24
[52] U.S. Cl. ...................................... 370/338; 455/161.1
[58] Field of Search .................................... 370/328, 329, 370/331, 332, 338, 346, 401, 402, 908, 910; 455/422, 432, 434, 435, 436, 440, 452, 456, 150.1, 154.1, 154.2, 161.1, 161.2; 382/312, 317, 321; 358/434, 439

[56] References Cited

U.S. PATENT DOCUMENTS

| | | | |
|---|---|---|---|
| 5,339,316 | 8/1994 | Diepstraten | 370/401 |
| 5,465,392 | 11/1995 | Baptist et al. | 455/38.3 |
| 5,570,084 | 10/1996 | Ritter et al. | 340/825.08 |
| 5,570,366 | 10/1996 | Baker et al. | 370/312 |
| 5,572,528 | 11/1996 | Shuen | 370/402 |
| 5,673,031 | 9/1997 | Meier | 340/825.05 |
| 5,724,346 | 3/1998 | Kobayashi et al. | 370/329 |
| 5,768,531 | 6/1998 | Lin | 395/200.72 |
| 5,774,461 | 6/1998 | Hyden et al. | 370/329 |
| 5,815,811 | 9/1998 | Pinard et al. | 455/434 |
| 5,822,361 | 10/1998 | Nakamura et al. | 370/338 |

*Primary Examiner*—Dang Ton
*Assistant Examiner*—Phirin Sam

[57] ABSTRACT

For use with a wireless computer network having a plurality of access points, a mobile station adapted for communicating with the network via a current access point and having a scanning circuit for locating a new access point, the scanning circuit requiring a scanning period of time to locate the new access point, a method of operation of the mobile station and a wireless computer network infrastructure. The mobile station comprises: (1) a detection circuit that generates a ready-to-scan signal indicating that the mobile station is about to activate the scanning circuit and (2) a suspension circuit, coupled to the detection circuit, that receives the ready-to-scan signal and generates, in response thereto, a data suspend signal for transmission to the current access point, the data suspend signal causing the current access point to suspend transmission of data to the mobile station, thereby preventing loss of the data during the scanning period.

20 Claims, 4 Drawing Sheets

FIG. 3A

| BYTES: | 2 | 2 | 6 | 6 | 6 | 2 | 6 | 0-2312 | 4 |
|---|---|---|---|---|---|---|---|---|---|
| | FRAME CONTROL | DURATION ID | ADDRESS 1 | ADDRESS 2 | ADDRESS 3 | SEQUENCE CONTROL | ADDRESS 4 | FRAME BODY | CRC |

FIG. 3B

| BITS: | 2 | 2 | 4 | 1 | 1 | 1 | 1 | 1 | 1 | 1 | 1 |
|---|---|---|---|---|---|---|---|---|---|---|---|
| | PROTOCOL VERSION | TYPE | SUB-TYPE | TO DS | FROM DS | MORE FRAG | RETRY | PWR. MGMT. | MORE DATA | WEP | ORDER |

FIG. 3C

| BYTES: | 2 | 2 | 6 | 6 | 4 |
|---|---|---|---|---|---|
| | FRAME CONTROL | SID | BSS ID | TA | CRC |

SYSTEM AND METHOD FOR PROVIDING SEAMLESS HANDOVER IN A WIRELESS COMPUTER NETWORK

TECHNICAL FIELD OF THE INVENTION

The present invention is directed, in general, to a wireless computer network and, more specifically, to a system and method for providing seamless handover in a wireless computer network.

BACKGROUND OF THE INVENTION

Computer systems configured as local area networks have been common for nearly two decades and are popular in a wide variety of business and educational applications. The most common LANs comprise a number of processing devices and a server that are coupled together by a hard-wired connection. Since about 1990, however, wireless local area networks (LANs) have become more common in the marketplace. Although the concept behind wireless LANS had been described a decade earlier, interest in LAN networks was limited until the release of the 2.4 GHz unlicensed band for industrial, scientific and medical (ISM) applications. Wireless LAN products most often employ either direct sequence spread spectrum (DSSS) or frequency hopping spread spectrum (FHSS) techniques to communicate between roaming mobile stations and network access points.

In a typical wireless computer network environment, the "backbone" of the LAN is a central server that communicates with a number of network access points through a hard-wired connection. Each access point (AP) includes a transceiver for communicating with at least one roaming mobile station (MS). The mobile station may be a point-of-sale terminal (i.e., an electronic cash register), a bar code reader or other scanner device, or a notepad, desktop or laptop computer. Each MS establishes a communication link with an AP by scanning the ISM band to find an available AP. Once a reliable link is established, the MS interacts with other mobile stations and/or the server. This allows the user of the MS to move freely in the office, factory, hospital or other facility where the wireless LAN is based, without being limited by the length of a hard-wired connection to the LAN.

Eventually, as a roaming mobile station moves in a multi-channel wireless LAN environment, the mobile station will move out of the range of its current access point. When this occurs, a "handover" takes place that breaks down the communication link between the mobile station and the current access point and establishes a new communication link between the mobile station and a new access point. The mobile station initiates this process when it detects that the link quality with the current access point has degraded below a specified threshold. The mobile station then begins looking for another access point, probably in a different frequency channel.

During this frequency scanning period, however, the mobile station will be tuned to a different frequency channel than is used by the current access point. Thus, any messages that are received by the current access point and destined for the mobile station that is scanning will be lost if transmitted during the scanning period. Present IEEE communication standards do not define protocols which allow the mobile station to inform the current access point that the mobile station is scanning and to request that the mobile station buffer any received messages for a short period of time.

Accordingly, there is needed in the art systems and methods that prevent loss of data during the scanning period of a roaming mobile station. There is a further need for systems and methods that prevent loss of data during the scanning period of a mobile station without modification of existing access points or wireless LAN systems.

SUMMARY OF THE INVENTION

To address the above-discussed deficiencies of the prior art, the present invention provides, for use with a wireless computer network having a plurality of access points, a mobile station adapted for communicating with the network via a current access point and having a scanning circuit for locating a new access point, the scanning circuit requiring a scanning period of time to locate the new access point, a method of operation of the mobile station and a wireless computer network infrastructure. The mobile station comprises: (1) a detection circuit that generates a ready-to-scan signal indicating that the mobile station is about to activate the scanning circuit and (2) a suspension circuit, coupled to the detection circuit, that receives the ready-to-scan signal and generates, in response thereto, a data suspend signal for transmission to the current access point, the data suspend signal causing the current access point to suspend transmission of data to the mobile station, thereby preventing loss of the data during the scanning period.

The present invention therefore introduces a system by which the mobile station can instruct the network (via the current access point) to suspend transmission of data to the mobile station while the mobile station is scanning to locate a new access point (an initial step in the handover process). Transmission of the data may be suspended only during the scanning period, or may extend to beyond the scanning period.

In one embodiment of the present invention, the current access point buffers the data during the scanning period. Local buffering of the data in the current access point allows efficient transmission after the scanning period has concluded. Of course, buffering is not necessary to the broad scope of the invention. The data may instead be retransmitted from its source within the network to the mobile station through the current access point, the new access point or some other access point.

In one embodiment of the present invention, the data suspend signal is a power save mode enable signal conforming to an IEEE 802.11 Air Interface protocol. The IEEE 802.11 protocol provides a power save mode signal, allowing a mobile station to enter a so-called "DOZE" state. During the mobile station's "DOZE" state, the current access point suspends transmission of any data destined for the mobile station until such time as the mobile station signals its awakening. The present invention can take advantage of this provision, "tricking" the current access point into suspending transmission during the scanning period, although the mobile station is not in a "DOZE" state.

In one embodiment of the present invention, the detection circuit is further capable of generating a scan-complete signal, the suspension circuit generating, in response thereto, a data resume signal for transmission to the current access point, the data resume signal causing the current access point to resume transmission of data to the mobile station. Once the scanning period is over, the detection circuit and suspension circuit preferably reestablish transmission of the data.

In one embodiment of the present invention, the suspension circuit is further capable of polling the current access point to cause the current access point to transmit the data to the mobile station. Once the scanning period is over, the current access point may be polled for data that would have been transmitted during the scanning period. Of course, the polling does not need to occur immediately after the scanning period is over. Further, the data need not have been buffered. However, if the data are buffered, the scanning and subsequent handover process appears "seamless" to both the network and the mobile station.

In one embodiment of the present invention, the suspension circuit is further capable of transmitting a data resume signal, the data resume signal being a power save mode disable signal and a polling signal conforming to the IEEE 802.11 Air Interface protocol. As above, the present invention can take advantage of the IEEE 802.11 protocol to cause transmission to resume.

In one embodiment of the present invention, the scanning circuit is a frequency scanning circuit. A wireless computer network infrastructure to be illustrated and described comprises a plurality of access points operating at various frequencies. The scanning circuitry within the mobile unit can therefore change frequencies to communicate with selected access points to determine their suitability as a new access point. This need not be the case, however. The mobile station can communicate with selected access points by means of a unique digital code or by any one of other conventional addressing schemes.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIGS. 3A–3C illustrate message frames according to an IEEE 802.11 protocol that the mobile station of FIG. 2 may employ to transmit buffering messages to the access point of FIG. 2.

DETAILED DESCRIPTION

Figure 1:
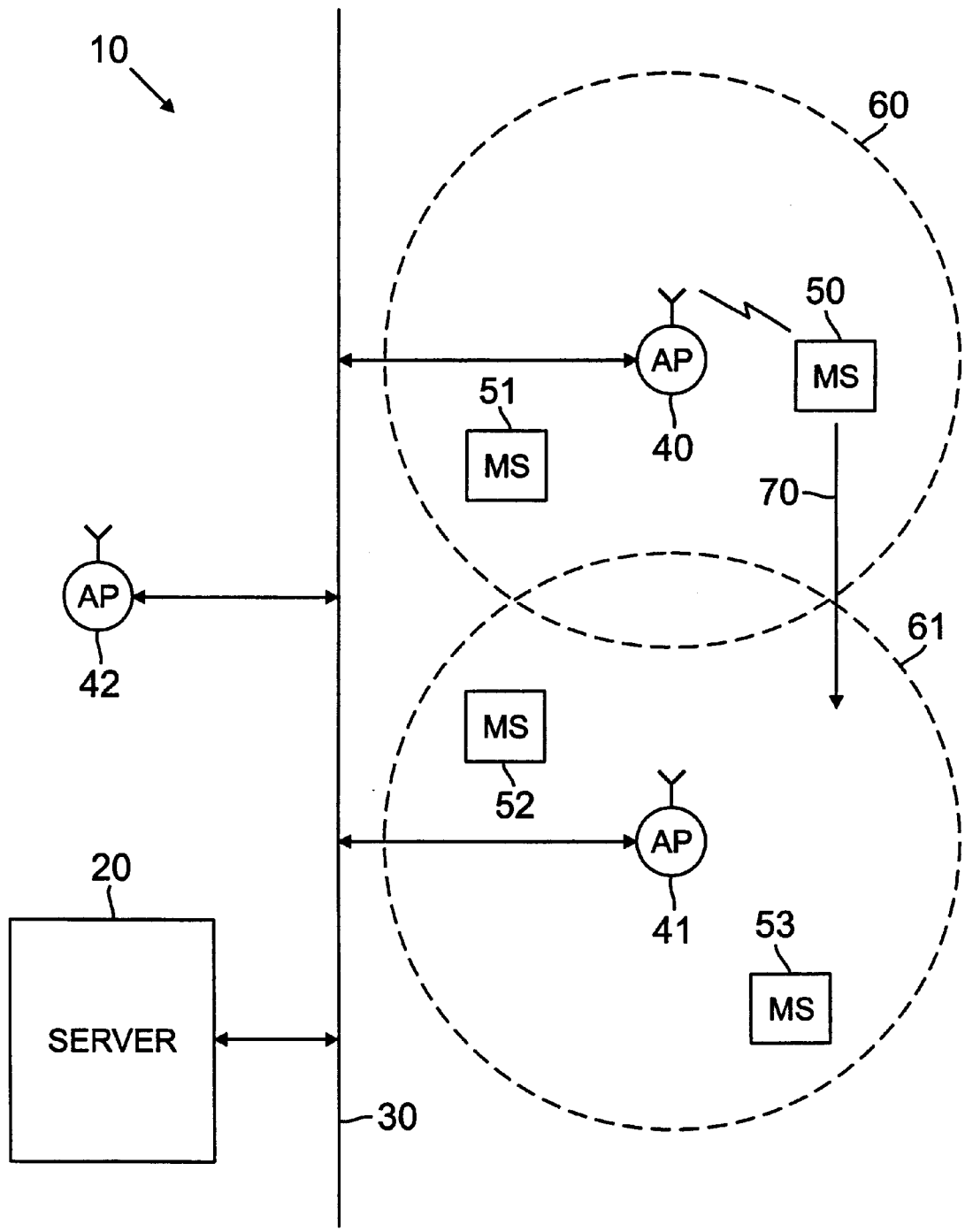
FIG. 1 illustrates a topological diagram of a wireless computer network.

Referring initially to FIG. 1, illustrated is the topology of wireless computer network 10. Server 20 of wireless network 10 communicates bi-directionally with access points 40–42 via bus 30, which is typically a hard-wired connection. In other embodiments, server 20 may communicate with one or more of access points 40–42 by wireless link. AP 40–42 also communicate with one or more mobile stations (MS) 50–53 by wireless link. Each access point can transmit data to and receive data from mobile stations that are within the specified broadcast range of the access point. For example, AP 40 and AP 41 have broadcast ranges 60 and 61, respectively. AP 40 can communicate with MS 50 and MS 51 and AP 41 can communicate with MS 52 and MS 53.

Although the exemplary broadcast coverage areas of AP 40 and AP 41 are circular in shape, it is possible for the broadcast area of an access point to assume other shapes, including hexagonal. The shape and size of the coverage area of an access point is frequently determined by obstructions that prevent the transmission of signals between the access point and a mobile station.

Following the release of the ISM bands, wireless computer networks have been implemented in a wide variety of systems. For example, network 10 may be a wireless LAN in an office building. Mobile stations 50–53 would typically be desktop and/or notebook computers that communicate with a document server, such as server 20, or run payroll or spreadsheet applications in connection with a server. Alternatively, network 10 may be a wireless LAN used to run the operations of a warehouse facility or manufacturing plant. Employees roaming the warehouse or factory floor, or even moving outside the facility, could communicate with a central server using a wide variety of mobile stations. For example, employees could use bar code scanners to send and receive data to/from server 20 through AP 40–42. Still other employees may roam a facility using notepad devices to update inventory in server 20. In still other embodiments, network 10 may a wireless LAN in a large department store and mobile stations 50–54 could be electronic cash registers and/or bar code readers.

As mobile stations 50–53 move about in the wireless LAN environment, the mobile stations will enter and leave the coverage areas of different access points. For example, as MS 50 moves in the direction of path 70, MS 50 moves away from its current access point, AP 40, to a new access point, AP 41. At some point in its movement along path 70, MS 50 determines that the signal quality of the link with current AP 40 has degraded below (or at least close to) an acceptable threshold level. When this occurs, MS 50 begins scanning for another AP in order to set up a "handover".

If current AP 40 attempts to transmit data to MS 50 during the scanning period, the data will be lost. To prevent this, the present invention takes advantage of a power saving protocol provision that is common in the power management scheme of many wireless systems. For example, in a computer network operating under the IEEE 802.11 wireless protocol, a mobile station may transmit a message to its current access point indicating that the mobile station is going into a "DOZE" state. This generally indicates that the mobile station is being turned off, or taken off-line, by the user. During the "DOZE" state of a mobile station, the access point buffers any messages destined for the mobile station in a designated power save queue until such time as the mobile station user comes back on-line and switches the power saver mode to "ACTIVE." At that point, the access point transmits all of the buffered messages that were received during the "DOZE" state of the mobile station.

Figure 2:
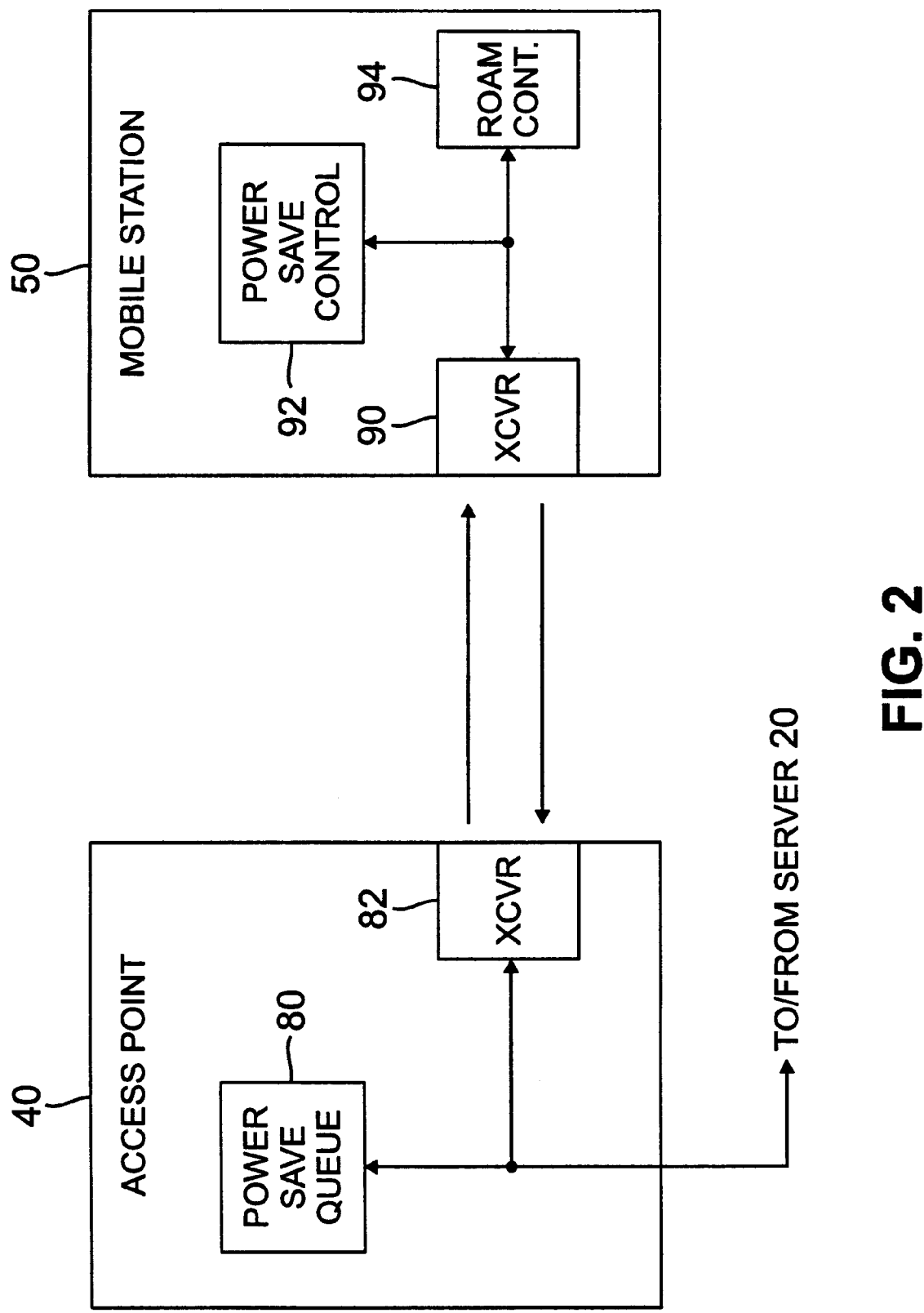
FIG. 2 illustrates a diagram of an access point and a mobile station of the wireless computer network of FIG. 1.

Turning now to FIG. 2, illustrated is a more detailed diagram of access point 40 and mobile station 50 of the wireless computer network of FIG. 1. MS 50 comprises power save control circuit 92, transceiver (XCVR) 90 and roam control circuit 94. AP 40 comprises power save queue 80 and transceiver (XCVR) 82. XCVR 82 and XCVR 90 provide communication between MS 50 and AP 40. Roam control circuit 94 of MS 50 monitors the quality of the signal received by XCVR 90 to determine whether or not it is necessary to initiate handover to another AP. When the signal falls below (or even close to) a minimum threshold level, roam control circuit 94 sends a ready-to-scan signal to power save control circuit 92.

Power save control circuit 92 responds to the ready-to-scan signal by sending a message to AP 40 that indicates that MS 50 is entering a power save mode and that new messages should be stored in power save queue 80. For example, in a wireless LAN operating under IEEE 802.11 protocol, power save control circuit 92 sends to AP 40 a standard NULL message with the power management (PM) bits in the header set to "PS" value (i.e., power save mode). In response, AP 40 stores all messages sent by server 20 and/or other network devices in power save queue 80 while MS 50 is in the "DOZE" state. Alternatively, AP 40 may refuse to accept data sent by server 20 and/or other network devices. Server 20 (or another network device) may then retransmit the data at a later time when MS 50 is back on-line.

While AP 40 is buffering data intended for MS 50 (or refusing to accept same), XCVR 90 of MS 50 scans for another AP. XCVR 90 may scan predetermined channels or scan randomly. When the scanning cycle is complete (whether successful or unsuccessful), XCVR 90 switches back to the frequency channel used by AP 40 and MS 50 transmits a message to AP 40 indicating that MS 50 has re-entered the active mode and that any messages stored during the "DOZE" state should be downloaded to MS 50. For example, in a wireless LAN operating under IEEE 802.11 protocol, at the end of the scan period, power save control circuit 92 sends to AP 40 a standard PS-POLL message with the power management (PM) bits in the header set to "A" value (i.e., active mode). AP 40 then ceases buffering messages for MS 50 and transmits all previously buffered messages.

Turning now to FIG. 3A, illustrated is a Medium Access Control (MAC) general frame format in accordance with IEEE 802.11 specification. The first seven fields, Frame Control, Duration/ID, Address 1–Address 4 and Sequence Control, comprise the MAC header set. The header set is followed by a Frame Body of up to 2312 data bytes and a CRC field. The first field of the header set is the Frame Control field, which is illustrated in greater detail in FIG. 3B. The thirteenth bit of the Frame Control field is the Power Management bit, which is used to indicate the power management mode of a mobile station. The value of the Power Management remains constant in each frame from a particular mobile station within a frame sequence. The value indicates the mode in which the station shall be after the successful completion of the frame exchange sequence. A value of 1 indicates that the mobile station shall be in Power Saver mode. A value of 0 indicates that the mobile station shall be in Active mode. The Power Management field is always set to 0 in frames transmitted by an access point.

A NULL frame is a particular type of MAC frame in which the two bits of the Type field are set to "10" and the four bits of the subtype field are set to "0100". By setting the Power Saver mode bit to 1 in a NULL frame, a mobile station can indicate (falsely) to an access point that the mobile station is entering the "DOZE" state and then begin a scanning operation while the access point buffers data.

Turning now to FIG. 3C, illustrated is a MAC PS-POLL frame format in accordance with IEEE 802.11 specification. The first four field, Frame Control, SID, BSS ID and TA, comprise the MAC header set. The Frame Control field of the PS-POLL frame has the same format as the Frame Control field illustrated in FIG. 3B. By setting the Power Saver mode bit to 0 in a PS-POLL message frame, a mobile station can exit the "DOZE" state and alert an access point that it is ready to receive buffered data.

Figure 4:
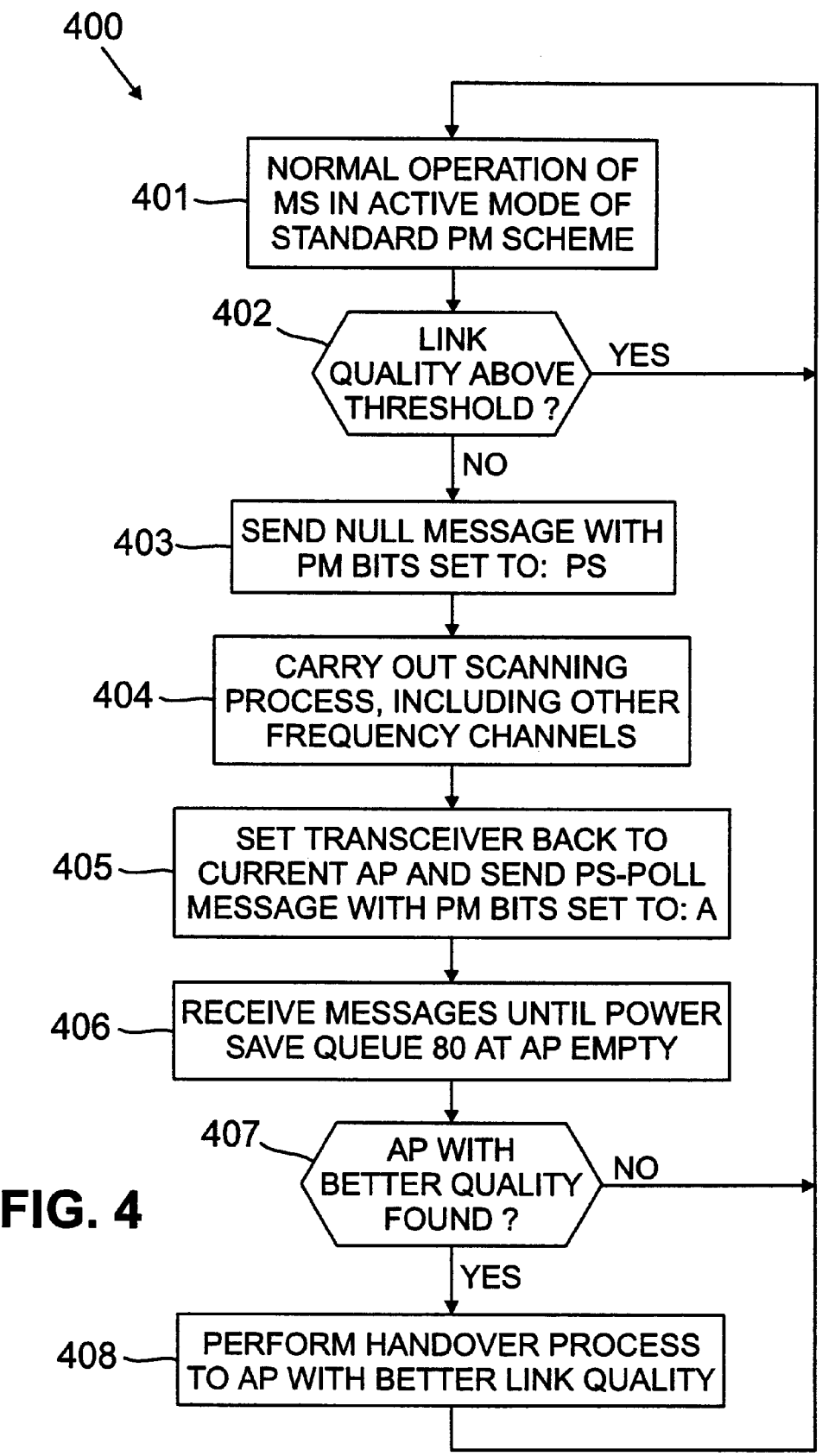
FIG. 4 illustrates a flow diagram of a method for providing seamless handover in a wireless computer network.

Turning now to FIG. 4, illustrated is flow diagram 400 of a method for providing seamless handover in a wireless computer network operating in accordance with an IEEE 802.11 protocol. Initially, in step 401, MS 50 is operating in the active mode of the standard Power Management (PM) scheme. In step 402, MS 50 iteratively monitors the quality of the wireless link with current AP 40. If the link quality remains above the threshold value, MS 50 returns to Step 401 and remains in the active mode.

However, if the link quality falls below (or even close to) the threshold level, MS 50 sends a NULL message to AP 40 with the power management bits set to "PS" (Step 403). This causes AP 40 to begin storing messages destined for MS 50 in a power management queue. MS 50 then scans for other access points operating in the same or in different frequency channels (step 404). After some time period of scanning, MS 50 will set XCVR 90 back to the frequency channel of current AP 40 (Step 405). This is done whether or not MS 50 has found a better AP signal. MS 50 then sends a power save poll (PS-POLL) message to current AP 40 with the power management bits in the header set to "A" (active mode).

In response to the PS-POLL message, AP 40 send any messages stored in the power management queue in power save queue 80 to MS 50 (Step 406). Once all of the messages are transferred, MS 50 switches to a new AP, if a new AP with a better quality link was found during the scanning period and resumes normal operation with the new AP (Steps 407, 408 and 401). If a better link was not found during the scanning period, MS 50 continues to communicate with current AP 40 (Steps 407 and 401).

Although the present invention has been described in detail, those skilled in the art should understand that they can make various changes, substitutions and alterations herein without departing from the spirit and scope of the invention in its broadest form.

What is claimed is:

1. For use with a wireless computer network having a plurality of access points, a mobile station adapted to communicate with said network via a current access point and having a scanning circuit for locating a new access point, said scanning circuit requiring a scanning period of time to locate said new access point, said mobile station comprising:

a detection circuit that generates a ready-to-scan signal indicating that said mobile station is about to activate said scanning circuit; and a suspension circuit, coupled to said detection circuit, that receives said ready-to-scan signal and generates, in response thereto, a data suspend signal for transmission to said current access point, said data suspend signal causing said current access point to suspend transmission of data to said mobile station, thereby preventing loss of said data during said scanning period.

2. The mobile station as recited in claim 1 wherein said current access point buffers said data during said scanning period.

3. The mobile station as recited in claim 1 wherein said data suspend signal is a power save mode enable signal conforming to an IEEE 802.11 protocol.

4. The mobile station as recited in claim 1 wherein said detection circuit is further capable of generating a scan-complete signal, said suspension circuit generating, in response thereto, a data resume signal for transmission to said current access point, said data resume signal causing said current access point to resume transmission of data to said mobile station.

5. The mobile station as recited in claim 1 wherein said suspension circuit is further capable of polling said current access point to cause said current access point to transmit said data to said mobile station.

6. The mobile station as recited in claim 1 wherein said suspension circuit is further capable of transmitting a data resume signal, said data resume signal being a power save mode disable signal and a polling signal conforming to an IEEE 802.11 protocol.

7. The mobile station as recited in claim 1 wherein said scanning circuit is a frequency scanning circuit.

8. For use with a wireless computer network having a plurality of access points and a mobile station adapted to communicate with said network via a current access point and having a scanning circuit for locating a new access point, said scanning circuit requiring a scanning period of time to locate said new access point, a method of preventing data loss during said scanning period, comprising the steps of:

generating a ready-to-scan signal, said ready-to-scan signal indicating that said mobile station is about to activate said scanning circuit; and generating, in response to said read-to-scan signal, a data suspend signal for transmission to said current access point, said data suspend signal causing said current access point to suspend transmission of data to said mobile station, thereby preventing loss of said data during said scanning period.

9. The method as recited in claim 8 further comprising the step of buffering said data in said current access point during said scanning period.

10. The method as recited in claim 8 wherein said data suspend signal is a power save mode enable signal conforming to an IEEE 802.11 protocol.

11. The method as recited in claim 8 further comprising the steps of:

generating a scan-complete signal indicating that said scanning period has terminated; and generating, in response to said scan-complete signal, a data resume signal for transmission to said current access point, said data resume signal causing said current access point to resume transmission of data to said mobile station.

12. The method as recited in claim 8 further comprising the step of polling said current access point to cause said current access point to transmit said data to said mobile station.

13. The method as recited in claim 8 further comprising the step of transmitting a data resume signal, said data resume signal being a power save mode disable signal and a polling signal conforming to an IEEE 802.11 protocol.

14. The method as recited in claim 8 wherein said scanning circuit is a frequency scanning circuit.

15. A wireless computer network infrastructure, comprising:

at least one central server having a plurality of access points operating at different frequencies; and a plurality of mobile stations adapted for communicating with said network via a corresponding plurality of current access points, each of said plurality of mobile stations having data processing and storage circuitry and a frequency scanning circuit for locating a new access point, said scanning circuit requiring a scanning period of time to locate said new access point, said each of said plurality of mobile stations further including:

a detection circuit that generates a ready-to-scan signal indicating that said mobile station is about to activate said frequency scanning circuit, and a suspension circuit, coupled to said detection circuit, that receives said ready-to-scan signal and generates, in response thereto, a data suspend signal for transmission to said current access point, said data suspend signal causing said current access point to suspend transmission of data to said mobile station, thereby preventing loss of said data during said scanning period.

16. The infrastructure as recited in claim 15 wherein said current access point buffers said data during said scanning period.

17. The infrastructure as recited in claim 15 wherein said data suspend signal is a power save mode enable signal conforming to an IEEE 802.11 protocol.

18. The infrastructure as recited in claim 15 wherein said detection circuit is further capable of generating a scan-complete signal, said suspension circuit generating, in response thereto, a data resume signal for transmission to said current access point, said data resume signal causing said current access point to resume transmission of data to said mobile station.

19. The infrastructure as recited in claim 15 wherein said suspension circuit is further capable of polling said current access point to cause said current access point to transmit said data to said mobile station.

20. The infrastructure as recited in claim 15 wherein said suspension circuit is further capable of transmitting a data resume signal, said data resume signal being a power save mode disable signal and a polling signal conforming to an IEEE 802.11 protocol.

* * * * *